United States Patent [19]

Wyman

[11] Patent Number: 5,364,042
[45] Date of Patent: Nov. 15, 1994

[54] SPOOL ADAPTER

[75] Inventor: Stuart J. Wyman, St. Paul, Minn.

[73] Assignee: Minnesota Mining and Manufacturing Company, St. Paul, Minn.

[21] Appl. No.: 506

[22] Filed: Jan. 5, 1993

[51] Int. Cl.⁵ ............................................. B65H 75/24
[52] U.S. Cl. .................................. 242/348; 242/578.2; 242/614
[58] Field of Search .................. 242/71.1, 71.9, 73, 242/71.8

[56] References Cited

U.S. PATENT DOCUMENTS

| | | | |
|---|---|---|---|
| 741,463 | 10/1903 | Courville | 242/71.9 |
| 2,095,516 | 10/1937 | Albright | 287/52 |
| 3,363,854 | 1/1968 | Becker, Jr. | 242/71.9 X |
| 3,447,759 | 6/1969 | Rau | 242/71.9 |
| 3,516,342 | 6/1970 | Luescher | 242/71.9 X |
| 4,142,923 | 3/1979 | Satava | 148/131 |
| 4,346,854 | 8/1982 | Markus et al. | 242/73 X |
| 5,053,795 | 10/1991 | Wyman | 354/275 |
| 5,064,135 | 11/1991 | Williamson et al. | 242/118.4 |
| 5,097,289 | 3/1992 | Lucht et al. | 242/71.9 X |

FOREIGN PATENT DOCUMENTS 888830A 2/1962 United Kingdom .
2139984A 11/1984 United Kingdom .

*Primary Examiner*—John M. Jillions
*Attorney, Agent, or Firm*—Gary L. Griswold; Walter N. Kirn; Charles D. Levine

[57] ABSTRACT

A C-shaped adapter for mounting on a spool on which a web of material is to be wound shortens the effective winding width of the spool. The adapter has a web-blocking portion which blocks the web by forming a flange. A holding portion positions the web-blocking portion on the spool. A lug on the adapter mates with a depression in the spool to prevent axial movement of the adapter along the spool. The web-blocking portion includes a body and two arms which extend from opposite sides of the body. The holding portion includes an open circular portion terminating in two legs which fit around the spool to secure the adapter to the spool.

22 Claims, 2 Drawing Sheets

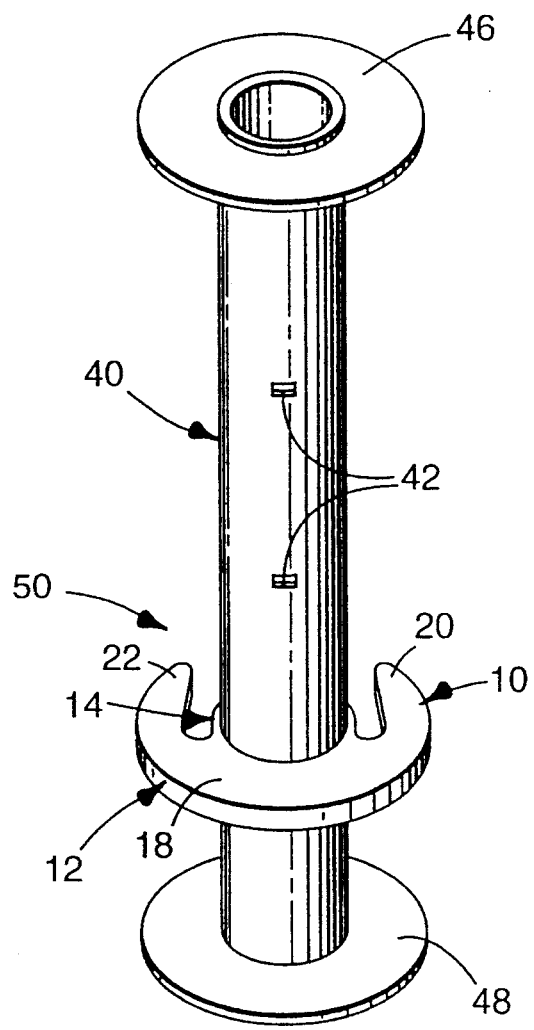
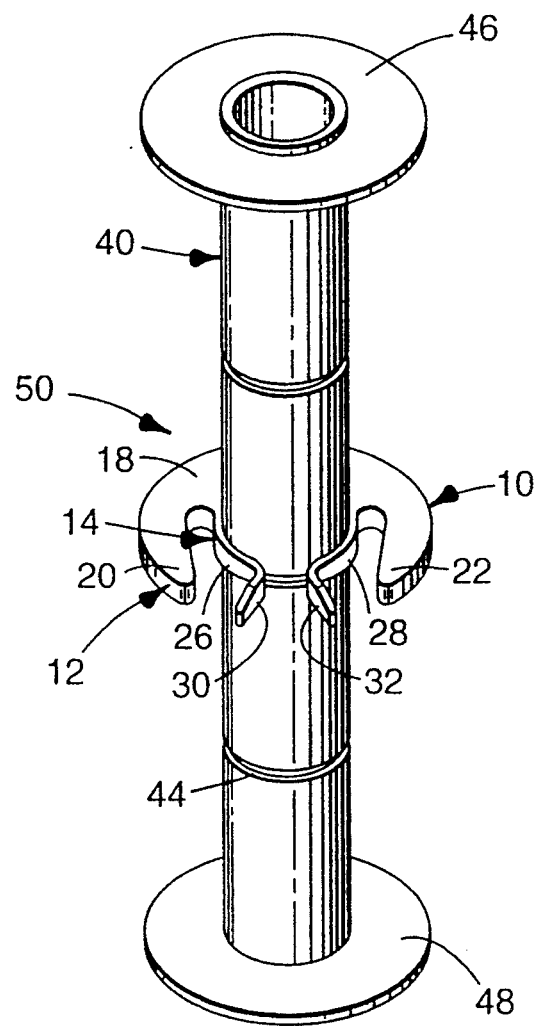
Fig. 1   Fig. 2
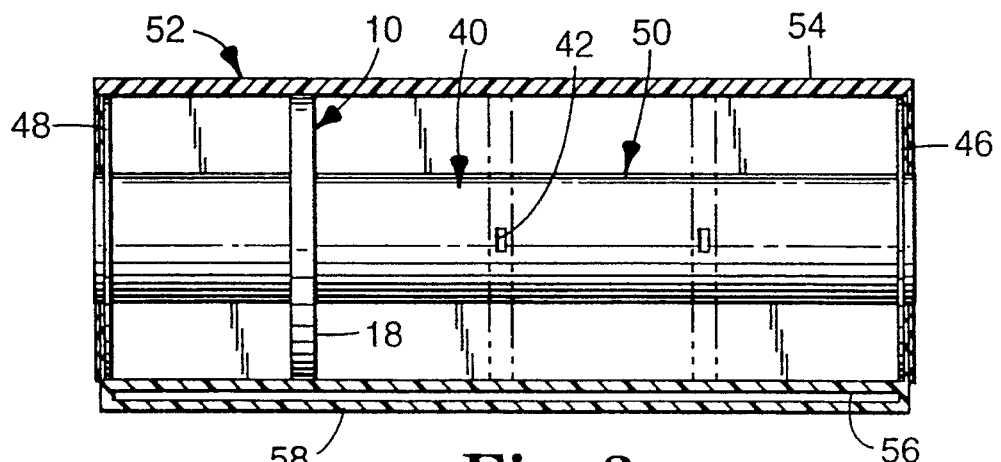
Fig. 3

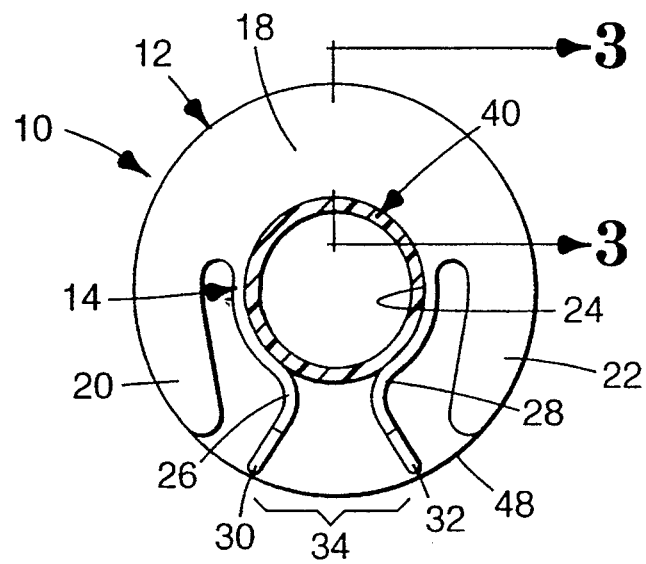
Fig. 4
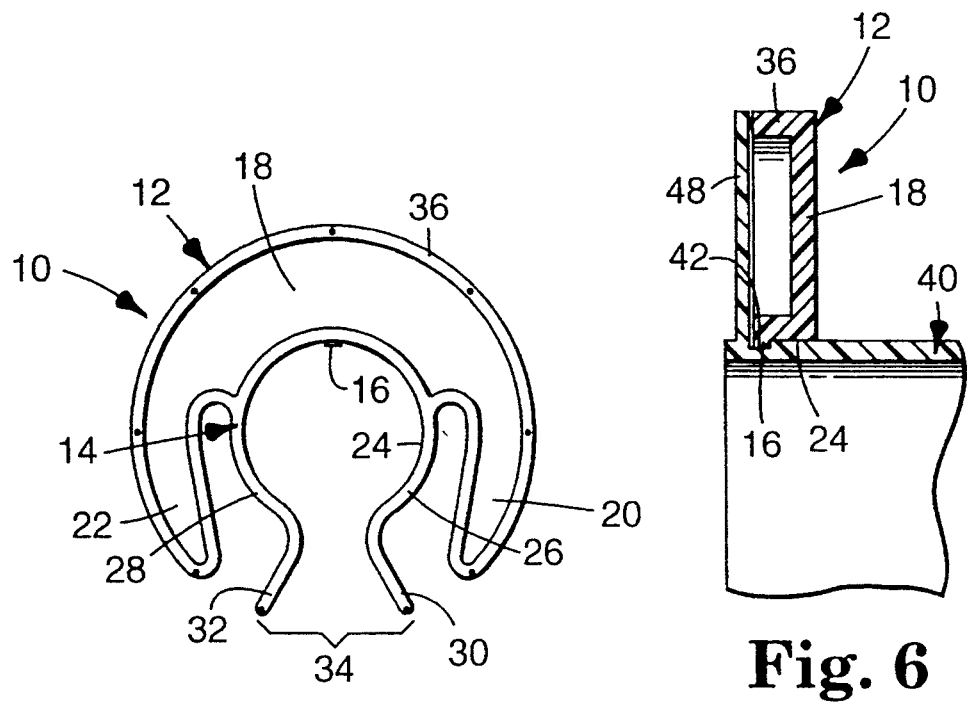
Fig. 5
Fig. 6

SPOOL ADAPTER

TECHNICAL FIELD

This invention relates to spool adapters. More particularly, the invention relates to a spool adapter which can be used with a spool for storing and dispensing a variety of webs having different widths.

BACKGROUND OF THE INVENTION

It is well known that webs wound onto a spool, shaft or winding core can require end support to guide the web during winding and unwinding. This end support also prevents the web from telescoping especially if the web is wound under uneven tension or has a tendency to slide on itself. One example of webs wound on a spool is light-sensitive, photographic materials contained in cassettes or cartridges.

Webs are typically stored on and dispensed from a spool which has a distance between the end flanges of the spool equal to the width of the web. End flanges are often formed integrally as part of the spool. It is also possible to form inner flanges integrally as part of the spool to allow for the winding of multiple webs on a single spool as disclosed in U.S. Pat. No. 5,053,795 granted to Wyman, the inventor of this invention.

It is also well known to wind a narrow web on a wider spool or shaft using an adjustable adapter. This type of adapter consists basically of two mating parts which fit around a spool or shaft and are held together with tightening bolts. Once placed on a spool or shaft, the bolts are tightened to clamp the adapter to the spool or shaft. To place this type of adapter to the spool or shaft, it must be either slid on from one end, or disassembled and reassembled around the spool or shaft. If the spool has integral end flanges, this adapter cannot be slid into position. If the flanges are not integral, one end flange must be removed to slide the adapter in place, then reapplied. Because this adapter has numerous components that require assemble when produced, it is expensive to produce, time consuming to assembly, and can be prone to failure.

One-piece clips used to secure brake or shifting cables onto the frame of a bicycle are also well known. This type of clip cannot guide a web if applied to a spool. Rather, it grasps or clamps both the bicycle frame and the cable.

There is a need for a more cost-effective adapter which more easily mounts on a spool, shaft, or core on which a web of material is to be wound and which shortens the effective winding width of the spool.

SUMMARY OF THE INVENTION

A unitary adapter formed as a single, molded component for mounting on a spool on which a web of material is to be wound shortens the effective winding width of the spool. The adapter has a web-blocking portion that blocks the web by forming a flange which has an outer dimension greater than the maximum diameter of a web wound on the spool. The adapter also has a holding portion separate from and connected to the web-blocking portion which positions and secures the adapter on the spool. The holding portion extends away from the web-blocking portion to form a channel between the holding portion and the web-blocking portion. The adapter also includes a lug which further secures the adapter to the spool. The adapter is formed integrally as one piece of an injection-molded plastic material.

The web-blocking portion includes a body and two arms extending from opposite sides of a radially outer portion of the body. The arms combine with the body to extend around the adapter.

The holding portion wraps around greater than 50% of the circumference of the spool and extends from a radially inner area of the body of the web-blocking portion. The holding portion includes an open circular portion terminating in two legs which wrap partially around the spool to secure the adapter to the spool. The legs include extensions projecting in different directions to form an increasing width wedge-shaped portion with the narrowest width closest the open circular portion and the widest width furthest from the open circular portion. The legs bias the open circular portion at the narrowest width portion of the wedge-shaped portion toward each other in a direction to attempt to close the circle of the open circular portion. This secures the holding portion around the spool and reduces axial movement of the adapter on the spool.

The adapter lug extends from the open circular portion of the holding portion and is receivable in a mating depression formed in the spool. When mated, axial movement of the adapter on the spool is further reduced. The lug is particularly useful when the adapter is mounted inwardly from the end flanges. When the adapter is mounted on the spool against one end flange, the adapter functions more as spacer than a separate flange if its thickness equals the difference between the spool width and the media width.

The spool can include a circular groove which extends around the spool. The groove mates with the lug on the adapter when the holding portion of the adapter is press fit around the spool.

BRIEF DESCRIPTION OF THE DRAWINGS

FIG. 1 is a perspective view of an adapter according to the present invention mounted on the spool having three mating depressions.

FIG. 2 is a perspective view of an adapter according to another embodiment of the present invention mounted on a spool having three circular grooves.

FIG. 3 is a cross-sectional view of a dispenser cartridge incorporating a spool and adapter.

FIG. 4 is a partial cross-sectional view of an adapter mounted on a spool according to the present invention.

FIG. 5 is a rear view of the adapter of FIG. 4.

FIG. 6 is a partial cross-sectional view of the adapter of FIG. 4 being press fit around a spool with the lug of the spool oriented to be received by the depression in the spool.

DETAILED DESCRIPTION OF PREFERRED EMBODIMENTS

A C-shaped adapter 10 for mounting on a spool 40 on which a web of material, such as an elongate strip of light sensitive photographic film, is to be wound shortens the effective winding width of the spool 40. This enables an existing width spool 40 to be used for a variety of web widths less than the width of the spool 40. The adapter 10 also prevents telescoping of the webs during and after winding, and facilitates straight tracking of the web during unwinding from the spool 40. Additionally, the adapter 10 prevents snagging and tearing of the web during distribution, handling, and dispensing.

The spool 40 has at least one depression 42, as shown in FIG. 1. Alternatively, the depressions 42 can be formed as circular grooves 44, as shown in FIG. 2. The spool 40 also has flanged ends 46, 48 and a diameter approximately equal to the inner diameter of the adapter 10 to permit the adapter 10 to be press fit on the spool 40. As illustrated in FIGS. 1 and 2, the adapter 10 locks onto the spool 40 when placed on the spool 40. It cannot slide along the spool 40 and can become permanently deformed during removal from the spool 40.

The adapter 10 combines with the spool 40 to form an apparatus 50, as illustrated in FIGS. 1 and 2, for storing and dispensing photographic films of various widths. The apparatus 50 can be used within a dispenser cartridge 52 as shown in FIG. 3. The cartridge 52 includes a hollow box 54 of opaque material encompassing the apparatus 50. The box 54 has a longitudinally extending light-tight exit slot 56 along a first side edge 58. A web wound on the apparatus 50 can be dispensed through the exit slot 56 of the cartridge 52.

As shown in FIG. 4, the adapter 10 includes a web-blocking portion 12 that forms a flange which has a diameter greater than the maximum diameter of a web wound on the spool 40. The adapter 10 also has a holding portion 14 separate from and connected to the web-blocking portion 12 which positions and secures the web-blocking portion 12 on the spool 40. The holding portion 14 extends away from the web-blocking portion 12 to form a channel between the holding portion 14 and the web-blocking portion 12. A lug 16, illustrated in FIGS. 5 and 6, further secures the adapter 10 on the spool 40. The adapter 10 is unitary. It is formed integrally as one piece of an injection-molded plastic material. One preferred material is high impact styrene. Other materials that provide adequate physical properties and cost-effectiveness also could be used.

The web-blocking portion 12 includes a body 18 extending for a portion of the web-blocking portion perimeter. The web-blocking portion 12 also includes two arms 20, 22 extending from opposite sides of radially outer portions of the body 18, although one arm could be used. The arms 20, 22 combine with the body 18 to extend the web-blocking portion 12 for approximately 75% of the total distance around the spool 40. The perimeter of the web-blocking portion 12 defines the shape of the adapter 10 which can be any shape such as rectangular or triangular, but is preferably circular and C-shaped.

The holding portion 14 of the adapter 10 wraps around greater than 50% of the circumference of the spool 40 and extends from a radially inner area of the body 18 of the web-blocking portion 12. The holding portion 14 includes an open circular portion 24 terminating in two legs 26, 28 which secure the adapter 10 to the spool 40. The legs 26, 28 include extensions 30, 32 projecting in different directions to form an increasing width wedge-shaped portion 34 with the narrowest width closest the open circular portion 24 and the widest width furthest from the open circular portion 24. The extensions 30, 32 project substantially to the outer perimeter of the web-blocking portion 12. As shown in FIG. 2, the free ends of the extensions 26, 28 are bevelled to avoid contacting the web. This prevents the legs from snagging and potentially tearing the web during winding or unwinding.

The legs 26, 28 of the holding portion 14 act as springs. As such, the legs 26, 28 are biased toward each other to attempt to close the open circular portion 24 and to secure the holding portion 14 around the spool 40. The material of the adapter 10 and the thickness and width of the legs 26, 28 can be selected to alter the biasing force.

As shown in FIG. 6, the lug 16 of the adapter 10 extends radially inwardly from the open circular portion 24 of the holding portion 14 and is received in a mating depression 42 formed in the spool 40. The depression 42, illustrated in FIG. 1, can be located anywhere along the spool 40, but is selected to mate with the adapter 10 in locations corresponding to desired web widths. The lug 16 locks into the depression 42 in the spool 40 when placed on the spool 40, preventing the adapter 10 from substantially moving axially along the spool 40. The only axial movement which can occur is due to the depression 42 being wider than the width of the lug 16. This further secures the adapter 10 on the spool 40. Alternatively, this system can be used without biasing the spool 40 with the holding portion 14. Increasing the size of the lug 16 or including multiple lugs which are received in multiple circumferential depressions 42 (not shown) further secures the adapter 10 on the spool 40. Multiple axial depressions along a single spool are useful to allow a single spool and adapter to accept a variety of webs having different widths.

Alternatively, the depression 42 can be a circular groove 44 which extends around the spool 10 as shown in FIG. 2. The groove 44 mates with the lug 16 on the adapter 10 when the holding portion 14 of the adapter 10 is press fit around the spool 40. Preferably, the spool 40 includes multiple circular grooves along its length to allow a single spool and adapter to accept a variety of webs having different widths. The groove 44 allows the adapter 10 to rotate on the spool 40 so that the web-blocking portion 12 can be optimally placed. The grooves are placed at selected locations corresponding to several standard widths of photographic films, such as 215.9 mm (8.5 in.), 210 mm (8.26 in.), and 152.4 mm (6.0 in.). Alternatively, grooves can be placed at various other axial locations on the spool for maximum media width flexibility. The thickness of the adapter 10 can be selected to fill the desired space on the spool 40. For example, the adapter 10 can be 5.9 mm (0.23 in.) thick and can be mounted adjacent a spool flange 46 on a 215.9 mm spool 40. This adapter 10 would convert the spool 40 from 215.9 mm to 210 mm without any space between the adapter 10 and the spool flange 46. Also, the thickness of the adapter 10 is selected to provide rigidity to the adapter 10. An adapter flange 36, shown in FIGS. 5 and 6, located on the perimeter of the adapter 10 provides additional rigidity to the adapter 10.

A plurality of adapters can be used on a single spool to permit simultaneous dispensing of several different webs from the same dispenser or cassette.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications can be affected therein by one skilled in the art without departing from the scope or spirit of the invention.

I claim:

1. A unitary adapter formed as a single, molded component for mounting on a spool on which a web of material is to be wound wherein the adapter shortens the effective winding width of the spool and comprises:
- a web-blocking portion having a maximum width dimension greater than the maximum diameter of a web to be wound on the spool to form a flange for the web;
- a holding portion which positions the adapter on the spool, wherein the holding portion is connected to and extends away from the web-blocking portion to form a channel between the holding portion and the web-blocking portion;
- means for connecting the web-blocking portion to the holding portion; and
- means for securing the holding portion on the outside of the spool without any substantial axial movement along the spool.

2. The adapter of claim 1 wherein the web-blocking portion comprises:
- a body extending for a portion of the web-blocking portion perimeter; and
- at least one arm which extends from a radially outer portion of the body for the remainder of the web-blocking portion perimeter.

3. The adapter of claim 2 wherein the web-blocking portion comprises two arms which extend from opposite sides of a radially outer portion of the body, wherein the arms combine with the body to extend for 75% of the total distance around the spool when the adapter is mounted on the spool.

4. The adapter of claim 3 wherein the web-blocking portion is C-shaped and has a generally circular outline.

5. The adapter of claim 1 wherein the holding portion wraps around greater than 50% of the circumference of the spool and wherein the securing means comprises means for biasing the holding portion around the spool.

6. The adapter of claim 5 wherein the holding portion extends from a radially inner area of the body of the web-blocking portion and comprises an open circular portion terminating in at least one leg which wraps around the spool to secure the adapter to the spool.

7. The adapter of claim 6 wherein the holding portion comprises two legs which are press fit around the spool.

8. The adapter of claim 1 wherein the securing means comprises at least one lug that extends from the holding portion and is receivable in a mating depression formed in the spool.

9. The adapter of claim 1 wherein the adapter is formed of an injection-molded plastic material.

10. An apparatus for storing and dispensing webs of various widths comprising:
- a spool having flanged ends; and
- a unitary adapter formed as a single, molded component for mounting on the spool to shorten the effective winding width of the spool comprising:
- a web-blocking portion having a maximum width greater than the diameter of a web to be wound on the spool to form a flange for the web;
- a holding portion which positions the adapter on the spool, wherein the holding portion is connected to and extends away from the web-blocking portion to form a channel between the holding portion and the web-blocking portion;
- means for connecting the web-blocking portion to the holding portion; and
- means for securing the holding portion on the outside of the spool without any substantial axial movement along the spool.

11. The apparatus of claim 10 wherein the spool is generally cylindrical and the diameter of the spool is approximately equal to the inner diameter of the holding portion to permit the adapter to be press fit on the spool.

12. The apparatus of claim 10 wherein the spool further comprises at least one depression, and wherein the adapter securing means comprises at least one lug that extends from the holding portion and is receivable in the depression when the holding portion is mounted around the spool.

13. The apparatus of claim 12 wherein each spool depression comprises a circular groove extending around the spool.

14. The apparatus of claim 12 wherein the spool depression extends less than 25% of the spool diameter.

15. The apparatus of claim 14 wherein the size of the lug is substantially equal to the size of the depression to permit little or no rotation of the adapter on the spool.

16. A dispenser cartridge for storing and dispensing webs of various widths comprising:
- a hollow box having an exit slot;
- a spool having flanged ends mounted in the hollow box; and
- a unitary adapter formed as a single, molded component for mounting on the spool to shorten the effective winding width of the spool comprising:
- a web-blocking portion having a maximum width greater than the diameter of a web wound on the spool to form a flange for the web;
- a holding portion which positions the adapter on the spool, wherein the holding portion is connected to and extends away from the web-blocking portion to form a channel between the holding portion and the web-blocking portion;
- means for connecting the web-blocking portion to the holding portion; and
- means for securing the holding portion on the outside of the spool without any substantial axial movement along the spool.

17. A unitary C-shaped adapter formed as a single, molded component for mounting on a spool on which a web of material is to be wound, wherein the adapter shortens the effective winding width of the spool and comprises:
- a web-blocking portion having a maximum diameter dimension greater than the maximum diameter of a web wound on the spool to form a flange for the web and comprising:
- a body extending for a portion of the web-blocking portion perimeter; and
- at least one arm which extends from a radially outer portion of the body for the remainder of the web-blocking portion perimeter;
- a holding portion which positions the adapter on the spool, wherein the holding portion is connected to and extends from a radially inner area of the body of the web-blocking portion to form a channel between the holding portion and the arm of the web-blocking portion, and wherein the holding portion comprises an open circular portion and at least one leg which extends from the open circular portion and which wraps around and is biased around the spool when press fit around the spool to secure the adapter to the spool; and
- means for securing the holding portion on the outside of the spool without any substantial axial movement along the spool comprising a lug that extends from the holding portion and is receivable in a mating depression formed in the spool.

18. A unitary adapter formed as a single, molded component for mounting on a spool on which a web of material is to be wound wherein the adapter shortens the effective winding width of the spool and comprises:
- a web-blocking portion having a maximum width dimension greater than the maximum diameter of a web to be wound on the spool to form a flange for the web; and
- a holding portion which positions the adapter on the spool, wherein the holding portion is connected to and extends away from the web-blocking portion to form a channel between the holding portion and the web-blocking portion.

19. A unitary adapter for mounting on a spool on which a web of material is to be wound wherein the adapter shortens the effective winding width of the spool and comprises:
- a web-blocking portion having a maximum width dimension greater than the maximum diameter of a web to be wound on the spool to form a flange for the web;
- a holding portion which positions the adapter on the spool;
- means for connecting the web-blocking portion to the holding portion; and
- means for securing the holding portion on the outside of the spool without any substantial axial movement along the spool, wherein the securing means comprises means for biasing the holding portion around the spool;
- wherein the holding portion wraps around greater than 50% of the circumference of the spool and extends from a radially inner area of the body of the web-blocking portion, the holding portion comprises an open circular portion terminating in two legs which are press fit around the spool to secure the adapter to the spool, and wherein each leg comprises an extension, wherein the extensions project in different directions to form an increasing width wedge-shaped portion with the narrowest width closest the open circular portion and the widest width furthest from the open circular portion; and wherein the biasing means comprises biasing the legs toward each other to attempt to close the circle.

20. The unitary adapter of claim 19 wherein the extensions project substantially to the outer perimeter of the web-blocking portion.

21. The unitary adapter of claim 19 wherein the ends of the extensions are beveled.

22. A unitary C-shaped adapter for mounting on a spool on which a web of material is to be wound, wherein the adapter shortens the effective winding width of the spool and comprises:
- a web-blocking portion having a maximum diameter dimension greater than the maximum diameter of a web wound on the spool to form a flange for the web and comprising:
  - a body extending for a portion of the web-blocking portion perimeter; and
  - at least one arm which extends from a radially outer portion of the body for the remainder of the web-blocking portion perimeter;
- a holding portion connected to the web-blocking portion which positions the adapter on the spool, wherein the holding portion is connected to and extends from a radially inner area of the body of the web-blocking portion to form a channel between the holding portion and the arm of the web-blocking portion, and wherein the holding portion comprises an open circular portion and at least one leg which extends from the open circular portion and which wraps around and is biased around the spool when press fit around the spool to secure the adapter to the spool;
- means for securing the holding portion on the outside of the spool without any substantial axial movement along the spool comprising a lug that extends from the holding portion and is receivable in a mating depression formed in the spool; and
- an extension projecting from each leg, wherein the extensions project in different directions to form an increasing width wedge-shaped portion with the narrowest width closest the open circular portion and the widest width furthest from the open circular portion, and wherein the legs are biased toward each other to attempt to close the circle.

* * * * *

UNITED STATES PATENT AND TRADEMARK OFFICE
CERTIFICATE OF CORRECTION

PATENT NO. : 5,364,042
DATED : Nov. 15, 1994
INVENTOR(S) : Wyman

It is certified that error appears in the above-indentified patent and that said Letters Patent is hereby corrected as shown below:

Column 1, line 41, delete "assemble"
  and insert --assembly--.

Column 1, line 42, delete "assembly"
  and insert --assemble--.

Signed and Sealed this

Ninth Day of May, 1995

Attest:

BRUCE LEHMAN

Attesting Officer        Commissioner of Patents and Trademarks